(12) United States Patent
Coors et al.

(10) Patent No.: US 9,683,700 B2
(45) Date of Patent: Jun. 20, 2017

(54) METALLIC LINER PRESSURE VESSEL COMPRISING POLAR BOSS

(71) Applicants:Andrew Coors, Morrison, CO (US); Kaushik Mallick, Thornton, CO (US); John Cronin, Denver, CO (US); Carl Chapel, Arvada, CO (US); Anna Padget-Shields, Golden, CO (US)

(72) Inventors: Andrew Coors, Morrison, CO (US); Kaushik Mallick, Thornton, CO (US); John Cronin, Denver, CO (US); Carl Chapel, Arvada, CO (US); Anna Padget-Shields, Golden, CO (US)

(73) Assignee: Steelhead Composites, LLC., Golden, CO (US)

( * ) Notice: Subject to any disclaimer, the term of this patent is extended or adjusted under 35 U.S.C. 154(b) by 79 days.

(21) Appl. No.: 14/282,160

(22) Filed: May 20, 2014

(65) Prior Publication Data

US 2015/0338023 A1    Nov. 26, 2015

(51) Int. Cl.
*F17C 1/08* (2006.01)
*F15B 1/16* (2006.01)
(Continued)

(52) U.S. Cl.
CPC ............... *F17C 1/08* (2013.01); *F15B 1/165* (2013.01); *F17C 1/00* (2013.01); *F17C 1/10* (2013.01); *F17C 13/026* (2013.01); *F17C 13/04* (2013.01); *F15B 2201/3152* (2013.01); *F15B 2201/3156* (2013.01); *F15B 2201/4056* (2013.01); *F15B 2201/41* (2013.01); *F15B 2201/415* (2013.01); *F15B 2201/605* (2013.01); *F15B 2201/61* (2013.01); *F17C 2201/018* (2013.01); *F17C 2201/0109* (2013.01); *F17C 2201/056* (2013.01); *F17C 2201/058* (2013.01); *F17C 2203/011* (2013.01); *F17C 2203/0604* (2013.01); *F17C 2203/0619* (2013.01); *F17C 2203/0639* (2013.01); *F17C 2203/0646* (2013.01); *F17C 2203/0648* (2013.01); *F17C 2203/0663* (2013.01); *F17C 2205/0305* (2013.01); *F17C 2209/2154* (2013.01); *F17C 2209/22* (2013.01); *F17C 2209/222* (2013.01);
(Continued)

(58) Field of Classification Search
CPC .. F17C 1/08; F17C 1/10; F17C 13/026; F17C 13/04; F15B 1/165
See application file for complete search history.

(56) References Cited

U.S. PATENT DOCUMENTS 3,232,318 A * 2/1966 Mercier .................... F15B 1/08
138/30
4,638,838 A * 1/1987 Richard .................... F15B 1/08
138/26
(Continued)

*Primary Examiner* — Anthony Stashick
*Assistant Examiner* — James Way
(74) *Attorney, Agent, or Firm* — Don D. Cha; Hamilton DeSanctis & Cha, LLP.

(57) ABSTRACT

The present invention provides a Type 3 pressure vessel comprising a polar boss that is attached to a metallic liner and provides reinforced static strength, fatigue strength, endurance, chemical resistance and/or corrosion resistance of the liner orifice or neck region. In particular, the material of the polar boss has higher static strength, fatigue strength, endurance, chemical resistance and/or corrosion resistance relative to that of the liner material.

17 Claims, 3 Drawing Sheets

(51) Int. Cl.
 *F17C 1/10* (2006.01)
 *F17C 13/02* (2006.01)
 *F17C 13/04* (2006.01)
 *F17C 1/00* (2006.01)

(52) U.S. Cl.
 CPC .. *F17C 2209/227* (2013.01); *F17C 2209/228* (2013.01); *F17C 2221/011* (2013.01); *F17C 2221/014* (2013.01); *F17C 2221/017* (2013.01); *F17C 2221/018* (2013.01); *F17C 2221/033* (2013.01); *F17C 2270/0178* (2013.01); *F17C 2270/0194* (2013.01); *F17C 2270/0554* (2013.01); *F17C 2270/079* (2013.01); *F17C 2270/0781* (2013.01); *Y10T 29/49828* (2015.01)

(56) References Cited

U.S. PATENT DOCUMENTS

| | | | | |
|---|---|---|---|---|
| 4,884,708 | A * | 12/1989 | Lange | F17C 1/00 206/0.6 |
| 5,429,845 | A * | 7/1995 | Newhouse | F17C 1/16 138/30 |
| 5,474,846 | A * | 12/1995 | Haldenby | B05D 1/002 220/581 |
| 5,518,141 | A * | 5/1996 | Newhouse | F17C 1/16 220/586 |
| 5,806,705 | A * | 9/1998 | Herald, Jr. | F16L 55/053 138/30 |
| 6,230,922 | B1 * | 5/2001 | Rasche | F17C 1/16 220/586 |
| 2009/0095366 | A1 * | 4/2009 | Gray, Jr. | F15B 1/165 138/30 |
| 2014/0061207 | A1 * | 3/2014 | Kloft | F15B 1/165 220/586 |

* cited by examiner

METALLIC LINER PRESSURE VESSEL COMPRISING POLAR BOSS

FIELD OF THE INVENTION

The present invention relates to a metal lined composite overwrapped pressure vessel comprising a polar boss that is attached to a metallic liner. In particular, the present invention relates to increasing the static strength, fatigue strength, endurance, chemical resistance and/or corrosion resistance of a pressure vessel's orifice region by attaching a polar boss whose material has a higher static strength, fatigue strength, endurance, chemical resistance and/or corrosion resistance relative to that of the liner material.

BACKGROUND OF THE INVENTION

Pressure vessels are used in a wide variety of applications to store fluids under pressure substantially higher than ambient pressure. Many applications require both lightweight and strong pressure vessels. A common shape for pressure vessel is a cylinder with port openings on both ends. At least one end of the pressure vessel contains an orifice to allow fill and drain of the fluid.

One particular application of pressure vessels is a bladder-type hydraulic accumulators. Accumulators are widely used in industries to dampen pulsations, compensate for thermal expansion, or provide auxiliary power. An accumulator consists of a high pressure vessel in which a substantially non-compressible hydraulic fluid is held under pressure by gas (e.g., nitrogen) that is encapsulated in a rubber bladder. Hydraulic fluid flows into the accumulator and compresses the gas contained inside the bladder by reducing its storage volume thereby storing energy. If the hydraulic fluid is released, it quickly flows out under the pressure of the expanding gas inside the bladder.

A bladder-type accumulator requires a port opening on (at least) one end of the vessel to allow insertion of the rubber bladder. Conventional accumulators are made out entirely of steel and are typically 8 inch (200 mm) in diameter with port openings in the range of 2.5 inch (63.5 mm) to 5 inch (127 mm).

Composite pressure vessels that are used as hydraulic accumulators are typically adapted from heritage designs. Heritage design vessels are generally meant for gaseous storage and have relatively small port openings, e.g., about 2.5 inch (63.5 mm) or less. This small port size relative to the vessel diameter limits the size and thickness of the bladder that can be used in the accumulator.

When the port opening is large, the pressure exerted by the internal pressure can potentially cause a catastrophic failure of the pressure vessel around the port opening under its operating conditions. In some cases, the vessel with larger port opening can experience premature fatigue failure during its life cycle with the failure emanating from the polar neck region. This is because the pressure experienced in or around the area near the port opening is a function of the pressure and the cross-sectional area of the orifice. Thus, the larger the port opening, greater the pressure exerted by the fluid on the orifice.

Accordingly, there is a need for accumulators or pressure vessels in general that can have a large port opening (e.g., orifice) without increasing the risk of catastrophic failure at or near the port opening due to a large blowout load experienced by the pressure vessel.

SUMMARY OF THE INVENTION

Some aspects of the invention provide a metal lined composite overwrapped pressure vessel, in which the neck region of a liner is reinforced by a polar boss. In particular, some aspects of the invention provide methods for reinforcing the neck region of a metallic liner of composite overwrapped pressure vessel with polar boss comprised of a material that has a significantly higher static strength, fatigue strength, endurance, chemical resistance and/or corrosion resistance than that of the liner material.

The invention also provides a pressure vessel design that does not require an excessively thick metallic liner neck wall, exotic threads or complicated composite wrapping patterns. The invention further provides improved form, fit and function of the attachment (e.g., plug, valve, regulator, temperature sensor, pressure sensor, etc.) in the port fitting of the metal lined composite overwrapped pressure vessel, including the sealing of the port fitting under high pressure.

DETAILED DESCRIPTION OF THE INVENTION

Figure 1:
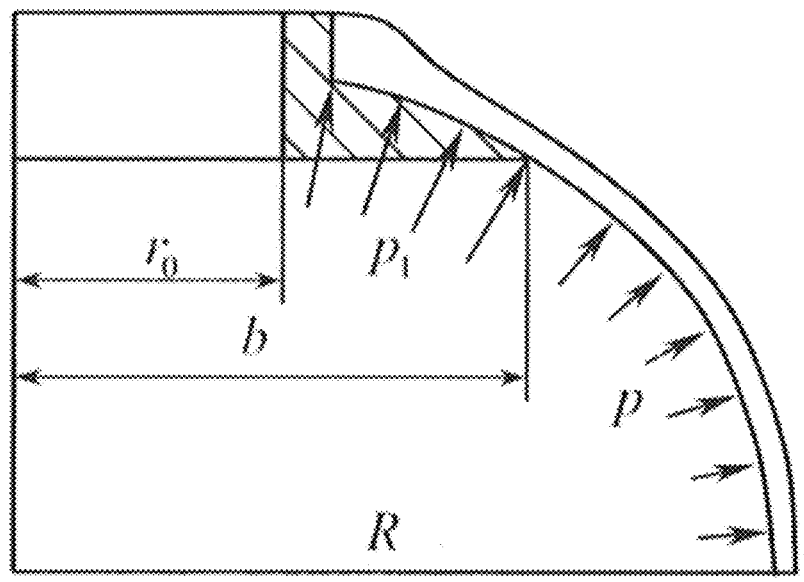
FIG. 1 is a schematic illustration showing the orifice geometry and internal pressure.

Composite pressure vessels are typically constructed by securing or overwrapping reinforcing fibers on a metallic or a polymeric liner that provides the fluid-impermeable barrier. Composite construction provides vessels which are both lightweight and strong. Accordingly, composite vessels are used in a wide variety of applications to store fluids under pressure. Each composite vessel defines a pressure chamber which contains a pressurized fluid that is typically moved in a controlled manner in or out of the vessel. For instance, pressurized oxygen is drawn from such vessels by fire fighters, scuba divers, and other people. Pressurized fluids for extinguishing fires are stored in such vessels in homes, public buildings, and many other locations. Compressed natural gas (CNG) is drawn from pressure vessels to fuel a variety of vehicles. Pressurized oxygen, acetylene, and other flammable gases are stored in such vessels for use by metal workers. Hospitals and dental offices store pressurized anesthetic gases and oxygen in pressure vessels, and research laboratories hold liquid nitrogen, liquid helium, and other cryogenic fluids in such vessels.

Because the resin matrix of a composite vessel may crack during use, composite vessels typically include a fluid-impermeable liner. Both metallic and non-metallic liners are used. Typically, the liner neck region is a protrusion, often an annular protrusion, within the liner polar region.

Pressure vessels find application in a wide assortment of different industries and they may be fabricated using a number of different structures. Typically, Type 1 vessels are fabricated of metal, Type 2 and Type 3 vessels are composite-overwrapped structures that employ a metallic liner, Type 4 vessels are composite-overwrapped structures that employ a polymer liner, and Type 5 vessels are linerless composite-overwrapped structures. See Table 1. Examples of lightweight applications where pressure vessels may find particular utility include use in self-contained breathing apparatus, in automotive gaseous fuel storage systems to store compressed natural gas, and for storing gaseous hydrogen on fuel cell vehicles. In other applications, lightweight pressure vessels may be used for hydraulic accumulators, chemical storage, transport, and gas, fluid and/or propellant storage for aircraft, launch vehicles, and spacecrafts.

TABLE 1

| Type of Pressure Vessels | | | | | |
| --- | --- | --- | --- | --- | --- |
| | Type 1 | Type 2 | Type 3 | Type 4 | Type 5 |
| Liner/Material | — | — | Steel or Aluminum | Polymer | — |
| Main Cylinder Body Material | Steel or Aluminum | Steel or Aluminum | Carbon and/or Glass Fiber Composite | Carbon and/or Glass Fiber Composite | Carbon or Glass Fiber Composite |
| Only Hoop Winding with Carbon and/or Glass Fiber No liner | — | X | — | — | — |
| Full Composite Overwrapping | — | — | X | X | X |

As can be seen in Table 1, some pressure vessels have a metal or a polymer that are overwrapped with a composite outer layer. The composite outer layer on conventional composite-overwrapped pressure vessels with either metallic or polymeric liners is typically designed to safeguard against structural failure by rupture or fatigue, while the liner is designed to contain the enclosed fluid.

To permit the movement of fluids into or out of the pressure vessel, it is conventionally equipped with an orifice and port fitting that is fitted around the orifice. The port fitting is often adapted for connection to flow-control devices such as valves, regulators or nozzles. In case of a hydraulic accumulator, the port fitting on the hydraulic end is fitted with a poppet valve to prevent extrusion or partial escape of the bladder. A common structure for the port fitting is to include a longitudinal passage through which fluid may flow, with the longitudinal axis of the port coinciding with the longitudinal axis of the pressure vessel.

Typically, in a Type 1, Type 2 or Type 3 composite pressure vessel, connection to flow-control devices is achieved by threading the interior of the metallic shell or liner. In most Type 3 composite pressure vessels, the metallic liner is aluminum. The liner is typically formed by forging or spin-forming process where a seamless extruded tube is spun and incrementally deformed by a roller head.

In a plastic lined (Type 4) or linerless (Type 5) composite pressure vessel, connection to flow control devices is achieved by threading the inside or outside of a polar boss. A polar boss refers to a device that is attached secondarily to the liner and/or composite shell and fits around the orifice of the vessel. Typically, the polar boss (as opposed to the metallic shell) is adapted for connection to flow-control devices such as valves or nozzles. A common structure is for the boss to include a longitudinal passage through which fluid may flow, with a flange secured to one end of the neck. Connection to flow-control devices is typically achieved by threading the interior of the passage at the end opposite the flange. The flange itself is secured to the interior to the pressure vessel.

During service, the orifice (of radius $r_0$) of the cylindrical pressure vessel (of radius R) is partially or completely closed. The pressure exerted by the contained fluid on the closed orifice is called the 'blow-out pressure'. The load or force (F) created by the pressure on the closed orifice (See FIG. 1) is the product of the pressure (p) and the cross-sectional area ($\pi r_0^2$) of the orifice, i.e. $F = p \times \pi r_0^2$. This is referred to as the "blowout load".

Accumulators typically have a large port opening on the hydraulic end, e.g., 2.5 inch (63.5 mm) diameter or larger. The high operating pressure of the accumulator exerts a very large blowout load on the closed port during operation.

Consequently, a large port opening poses a significant design challenge for the pressure vessel, requiring a very thick walled liner, exotic threads that can prevent thread failures under shear and/or complicated composite wrapping patterns around the polar neck.

The blowout load is transferred to the mechanical connection between the device that plugs the orifice (herein referred to as a plug) and the neck of the vessel that holds the device. Typically, the mechanical connection between the device and the vessel neck is a threaded connection. Since the blowout load is reacted by the threaded connection, the type of thread form has a direct influence on the strength of mechanical connection between the plug and the orifice. Helical or screw threads are commonly used in the port fitting of a pressure vessel. However, in hydraulic applications other thread forms such as buttress or Whitworth threads are used to improve the strength of the mechanical connection and/or provide better sealing against leakage of hydraulic fluid through the port fitting.

The blowout load is reacted by the mechanical connection between the plug and the structure of the vessel that surrounds the orifice. In case of monolithic metallic (Type 1) or metal lined (Type 2) pressure vessels, this blowout load is reacted by the metallic shell that surrounds the orifice. In case of Type 3 pressure vessel, this blowout load is reacted by the threads in the metallic liner and is transferred to the metallic liner as well as the composite overwrap around the liner neck. In case of Type 4 or Type 5 pressure vessels, the blowout load is reacted by the threads in the polar boss and is transferred to the conjugate structure of the polar boss and composite overwrap around the polar boss.

In a Type 1, 2 or 3 pressure vessel, the threads inside the orifice of the metallic shell are designed to withstand the blowout load that the vessel is going to experience throughout its service life. It is commonplace to find failures emanate from the threads inside the orifice. These failures can result from a variety of factors including: accidental over-pressurization of the vessel; fatigue due to repeated loading and unloading of the vessel; environmentally assisted stress corrosion; stress rupture from sustained loading; incompatibility between dissimilar materials for the fitting and the port; degradation of the material's strength over time, and/or a combination of the above factors. Failures can result in catastrophic rupture of the neck and orifice area and a projectile of the plug or fitting that is attached to the orifice.

The blowout load is directly proportional to the pressure contained by the vessel and the square of the diameter of the circular orifice. The higher the operating pressure and larger the orifice, the higher is the blowout load and the more stress is reacted by the threads inside the orifice that holds the plug from escaping the orifice. In addition, if the mechanical connection between the plug and the neck is intact, the blowout load is reacted by the annular area of the vessel neck.

If the port opening in a pressure vessel is small, the stress in the annular area of the neck is small and below the material's strength. If the port opening is large, it can create a situation where the stress reacted by the neck at the vessel's operating pressure exceeds the material's strength. If it exceeds the yield strength of the material in the metallic neck, it can cause permanent deformation of the structure. If in extreme case it exceeds the rupture strength of the material, catastrophic failure may result by polar blowout. The stress reacted by the neck at the vessel's operating pressure may also be substantial to cause fatigue failure of the neck or the threads or both, leading up to a catastrophic or premature failure of the neck.

The most common aluminum alloy used for Type 3 pressure vessels is 6061-T6. The design of the threaded connection and the wall thickness of the vessel's neck are dictated by the material strength of Aluminum. If the port opening is big, the design to account for blowout load requires a very thick neck wall that may not be feasible to manufacture by the traditional neck forming process such as forging or spin-forming.

Some aspects of the invention provide reinforcement of the neck of Type 3 pressure vessels by using a polar boss. In particular, one embodiment of the invention is related to reinforcing the neck in the metallic liner in a Type 3 pressure vessel with a material that is significantly stronger than the base material for the liner. The material for the polar boss can be selected such that it has improved static strength, fatigue strength, endurance, chemical resistance, corrosion resistance, etc. compared to the base material of the liner. For example, if the liner material is aluminum, a polar boss made from steel can be used to reinforce the liner neck, since steel is significantly stiffer and stronger than the aluminum alloy.

The polar boss can be attached to the liner in a variety of ways. One particular embodiment is to use mechanical threads between the neck and the polar boss. In this case threads can be machined on the outside surface of the neck in the liner and the polar boss can be threaded on to the neck, producing a liner assembly that will be subsequently overwrapped with composite. In another embodiment, the polar boss is adhesively bonded to the outside of the neck. In still another embodiment, the polar boss is mated to the liner using a differential thermal expansion effect. In yet another embodiment, the polar boss is press-fitted on to the liner using key ways machined on the mating surfaces. It should be appreciated that a combination of the above methods can also be used.

Devices and methods of the invention allow attachment of the port fitting or plug to the polar boss as opposed to the liner neck. If a mechanical threaded connection exists between the port fitting and the polar boss, the blowout load is now reacted by the threads in the polar boss (e.g., steel) as opposed to the threads in the metallic liner (e.g., aluminum). In the example of a steel polar boss attached to the aluminum liner, the strength of steel is higher than aluminum, and therefore the threaded connection can be much stronger against blowout load for a given thread engagement between the plug and the orifice. When the threaded connection is effective, the blowout load is further reacted by the flange of the polar boss and the composite overwrap surrounding the flange. The invention therefore relieves the liner neck from supporting the blowout load entirely on its own. The wall thickness of the liner near the neck area does not need to be designed to carry the blowout load. This enables cost-effective fabrication of liners with moderate wall thickness in the neck area using traditional spin-forming or forging process.

The mating surfaces between the liner and the polar boss is designed carefully to ensure an intimate contact. In some embodiments, the mating surface of the liner is machined to allow for a good fit with the polar boss. In one particular embodiment, the liner dome profile is configured to accommodate a flat surface (e.g., flange) of the polar boss to sit square (i.e., fit) on the liner. The flat surface on the liner can be achieved in the forging or spin-forming process required to produce the liner. The flat surface can also be produced by secondary machining of the liner dome profile. A combination of the above processes can also be used to provide a flat mating surface on the liner.

In another embodiment the mating surfaces between the polar boss flange and the liner polar region can be curved. Both spin-forming and/or secondary machining process can be used to achieve this curved surface.

In yet another embodiment, the mating surface can be formed after the composite overwrap has been complete. For example, during the autofrettage process, the vessel can be pressurized to plastically yield the liner and conform to the inside profile of the polar boss and the composite shell.

Figure 2:
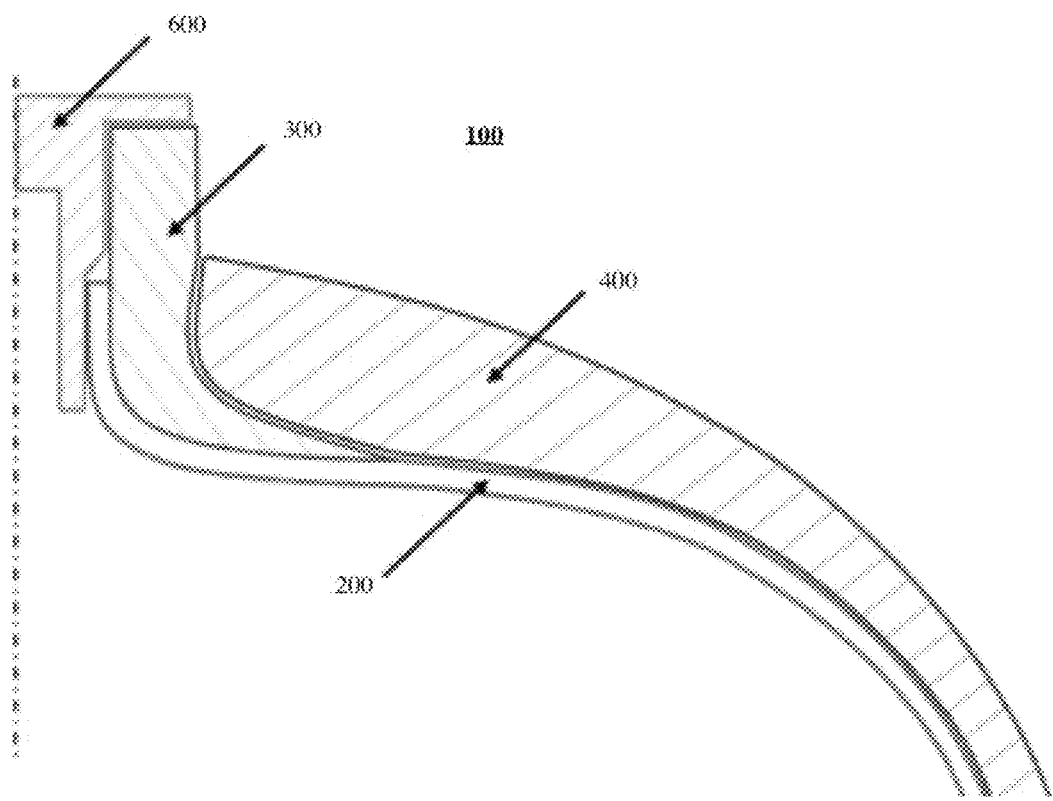
FIG. 2 is a cut out sectional view of one embodiment of the invention showing a relative position of polar boss 300 and liner 200.
Figure 3:
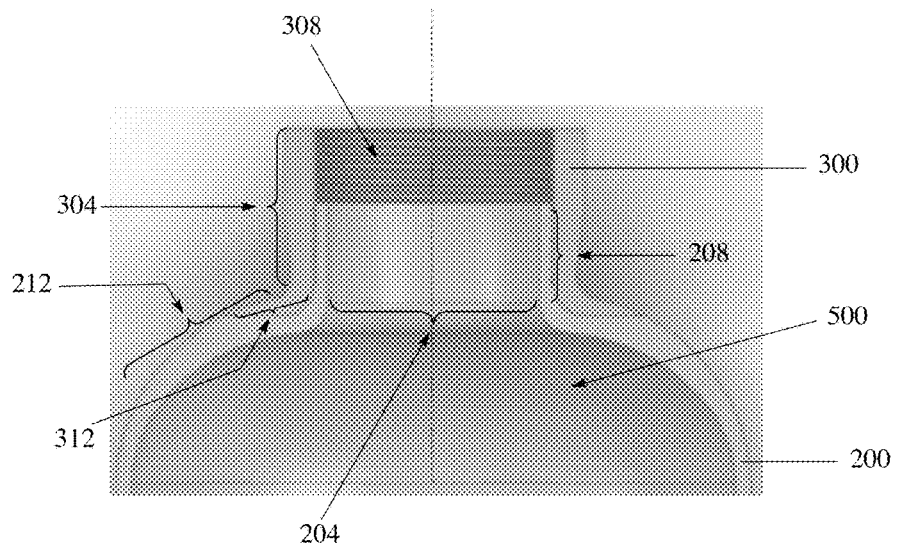
FIG. 3 is a partial cross-sectional view of one particular embodiment of a pressure vessel of the invention without any plug or an adapter fitted onto the orifice.
Figure 4:
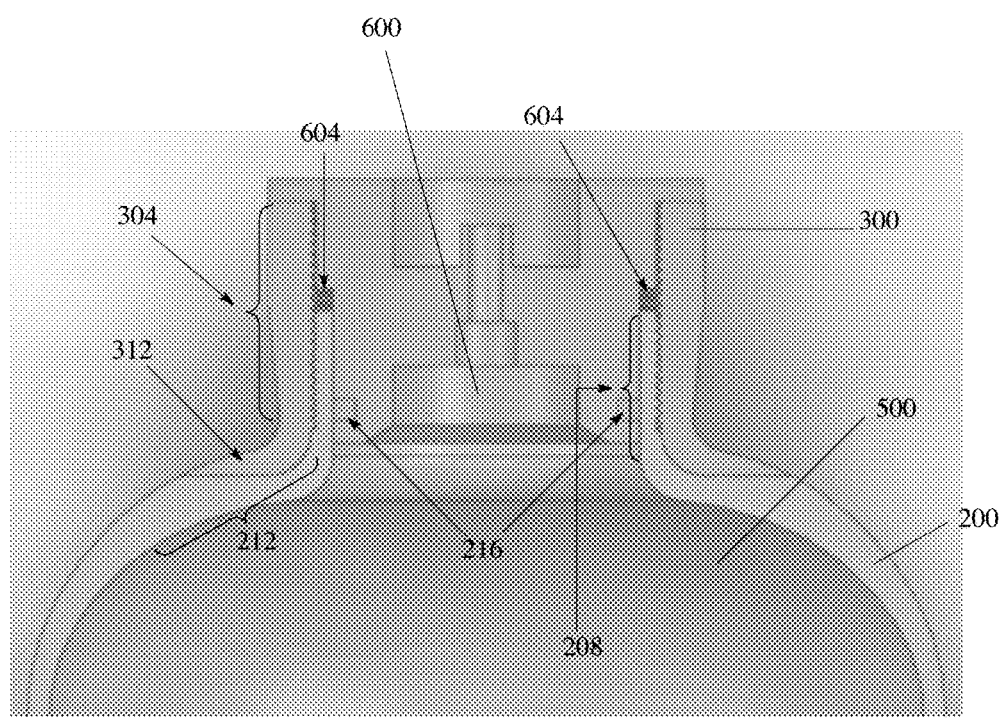
FIG. 4 is a partial cross-sectional view of another embodiment of a pressure vessel of the invention with a poppet valve fitted onto polar boss 300.

The present invention will now be described in more detail with regard to the accompanying drawings which assist in illustrating various features of the invention. In this regard, the present invention generally relates to pressure vessels in which the orifice or the port opening has been reinforced with a polar boss. Exemplary embodiments of pressure vessels of the invention are generally illustrated in FIGS. 2 to 4, which are provided solely for the purpose of merely illustrating the practice of the invention. It should be appreciated that these Figures do not constitute any limitations on the scope of the invention disclosed herein.

Some embodiment of the invention provides pressure vessels that are designed with a larger port opening (i.e., orifice 204) on at least one end. In one particular embodiment, the diameter of orifice 204 is at least 3 inches (76 mm), in some instances at least 4 inches (102 mm), and still in other instances at least 5 inches (127 mm). However, it should be appreciated that the scope of the invention does not limit the diameter of orifice 204 to any particular size. In general, the scope of the invention includes a pressure vessel of any orifice 204 diameter size. However, the invention is particularly useful for pressure vessel with a relative large orifice 204 diameter. In the application of a bladder hydraulic accumulator the large port opening (i.e., orifice 204) not only allows for easy installation of the bladder 500, but also accommodates a bladder with greater wall thickness that results in low permeability of the stored gaseous content and longer life span for the bladders.

The invention is generally applicable to any metallic lined pressure vessels (Type 3 pressure vessels). In one particular embodiment, the pressure vessel 100 is an aluminum-lined composite overwrapped pressure vessel. In one particular instance, the invention is suitable in overcoming the challenge of designing a relatively large diameter of orifice 204 in a metal-lined composite pressure vessel.

Referring to FIGS. 2-4, the invention relates to a composite overwrapped pressure vessel 100 comprising a metallic liner 200 having a liner orifice 204, a liner neck region 208 and a liner polar region 212 surrounding liner neck region 208. The liner neck region 208 (i.e., the protrusion within the liner polar region 212) has an outer surface and an inner surface. Pressure vessel 100 also includes a polar boss 300 that includes a polar boss neck region 304 (e.g., an annular billet), a passage 308 within polar boss neck region 304 that is coaxially aligned with liner orifice 204 and the protrusion within the liner polar region, i.e., the liner neck region 208. As discussed above, pressure vessel 100 is typically Type 3 pressure vessel. In one particular embodiment, pressure vessel 100 is a composite overwrapped pressure vessel 100 as shown in FIG. 2. As used herein, the term "composite overwrapped pressure vessel" refers to a pressure vessel in which at least a portion of liner 200 is overwrapped or enclosed with a composite material 400.

To permit controlled movement of fluids in or out of pressure vessel 100, pressure vessel 100 is typically configured with orifice 204 in the liner 200 and a polar boss 300 is fitted about orifice 204, in particular around a liner neck region 208. Polar boss 300 is threaded or otherwise shaped for connection to a plug which can be a nozzle, a valve, a gauge, a tube, or other similar fixture that can direct and/or control fluid flow.

Polar boss 300 typically includes a polar boss neck region 304 with a longitudinal passage 308 that provides fluid communication between pressure vessel 100 and the environment outside the pressure vessel 100. A longitudinal axis (dash line in FIG. 3) is defined within liner neck region 208 substantially parallel to passage 308. In some embodiments, a polar boss flange 312 is secured to the liner polar region 212. Polar boss flange 312, which is larger than the diameter of liner orifice 204, is placed on the surface of liner polar region 212. Movement of polar boss 300 with respect to liner 200 is restricted or prevented using any of the methods known to one skilled in the art.

Liner 200 is made of a metallic material to provide a permeation barrier to the fluid contents when pressure vessel 100 is filled and to support a fraction of the structural load when pressure vessel 100 is pressurized. Suitable metallic materials for liner 200 include, but are not limited to, aluminum, aluminum alloy, copper, titanium, steel alloy, and a combination thereof. Liner neck region 208 surrounds orifice 204 and has an outer and inner surfaces.

In order to reinforce or provide a stronger mechanical strength to withstand the blowout load, polar boss 300 comprises a material having static strength, fatigue strength, endurance, chemical resistance and/or corrosion resistance greater than the static strength, fatigue strength, endurance, chemical resistance and/or corrosion resistance of the metallic material of liner 200. Suitable materials for polar boss 300 include, but are not limited to, a metal alloy, steel, steel alloy such as Inconel and invar, titanium, aluminum alloy, brass, beryllium, a ceramic, a composite material, and a combination thereof. It should be appreciated that the scope of the invention is not limited to such materials listed herein. In general, all that is required is that the material of polar boss 300 has the static strength, fatigue strength, endurance, chemical resistance and/or corrosion resistance greater than that of the metallic material of liner 200.

Polar boss 300 further comprises a polar boss neck region 304 having an inner surface and an outer surface. At least a portion of the inner surface of polar boss neck region 304 is securely, and optionally detachably, attached to at least a portion of the outer surface of liner neck region 208. This secure attachment of polar boss 300 to liner 200 can be achieved by any of the methods known to one skilled in the art including, but not limited to, by a mechanical means, adhesives, thermally induced interference fitting, keyway slots, lock pin, welded joints, friction fit, frictional weld, or a combination thereof. In one particular embodiment, the inner surface of polar boss neck region 304 comprises a polar boss connecting element and the outer surface of liner neck region 208 comprises a liner connecting element. In this manner, liner neck region 208 is attached to polar boss neck region 304 by engagement of the polar boss connecting element to the liner connecting element. In one specific instance as illustrated in FIG. 4, the liner connecting element comprises a male threaded element and the polar boss connecting element comprises a complementary female threaded element. This configuration allows polar boss neck region 304 be attached to liner neck region 208 by having the complementary female threaded element engaged onto the male threaded element.

In another embodiment, the liner connecting element and the polar boss connecting element are corresponding parts of a mechanical connection that securely attaches polar boss 300 to liner 200 and prevents relative motion between the two. Yet in another embodiments, the liner connecting element and the polar boss connecting element are corresponding parts of a thermally induced interference fit. In this manner, polar boss 300 is place onto liner 200 and the combination is heated to melt or thermally secure two elements. Still in another embodiment, the liner connecting element and the polar boss connecting element are corresponding parts of a sealed interface. Such sealed interface prevents flow of hydraulic or pneumatic fluid out of the pressure vessel in operation.

Regardless of type of attachment used to securely place polar boss 300 onto liner 200, as can be inferred from FIGS. 3 and 4, the longer securing means between polar boss 300 and liner 200 will result in a more secure attachment. Thus, the length of liner neck region 208 is typically between 5% to about 90% of the length of polar neck region 304. As can be seen in FIGS. 3 and 4, the top portion of polar boss neck region 304 is configured to allow attachment of a plug or other port fitting device. Exemplary port fitting devices include, but are not limited to, a housing for poppet valve (as illustrated in FIG. 4), a nozzle, a plug, a regulator, a pressure sensor, a temperature sensor or a pressure relief device. The port fitting device can be a valve that can facilitate fluid exchange to/from the pressure vessel with the outside environment.

In some instances, pressure vessel 100 also includes a bladder 500. Typically, bladder 500 is inserted into liner 200 through liner orifice 204. Such a configuration allows pressure vessel 100 to be used as a hydraulic accumulator.

Referring to FIG. 2, in some embodiments composite material 400 encapsulates liner 200 and at least a portion of polar boss 300. Overwrapping liner 200 and polar boss 300 with composite material 400 increases the blowout load tolerance of pressure vessel 100.

In an alternative embodiment, the outer surface of polar boss neck region 304 is attached to at least a portion of the inner surface of liner neck region 208. That is, rather than having liner neck region 208 inserted into polar boss neck region 304, in this embodiment it is polar boss neck region 304 that is inserted into orifice 204 of liner neck region 208.

Pressure vessel 100 of the invention also includes a polar boss annular flange 312 that covers at least a portion of liner polar region 212.

Other embodiments of the invention include a pressure sealing surface between the plug (e.g., a poppet valve as shown in 600 FIG. 4) and the orifice in a Type 3 pressure vessel. Since the inside surface of the liner does not contain internal threads, this surface can be machined and bored to mate with a concentric surface of the plug 600 with a radial seal 216. Alternately, or in addition, the sealing can also take place in the shape of a face seal 604 between mating surfaces of the plug 600 and top lip of liner 200.

In other embodiments, the inner surface of polar boss neck region 304 comprises a polar boss interface element and the outer surface of liner neck region 208 comprises a liner interface. Polar boss 300 can be attached to liner 200 through a packing material, o-ring seal, x-ring seal, or a gasket between the polar boss connecting element and the liner connecting element. Alternatively, the outer surface of polar boss neck region 304 comprises a polar boss interface element and the inner surface of liner neck region 208 comprises a liner interface. In this configuration, polar boss 300 can also be attached to liner 200 through a packing material, o-ring seal, x-ring seal, or a gasket between the polar boss connecting element to the liner connecting element.

Figure 5:
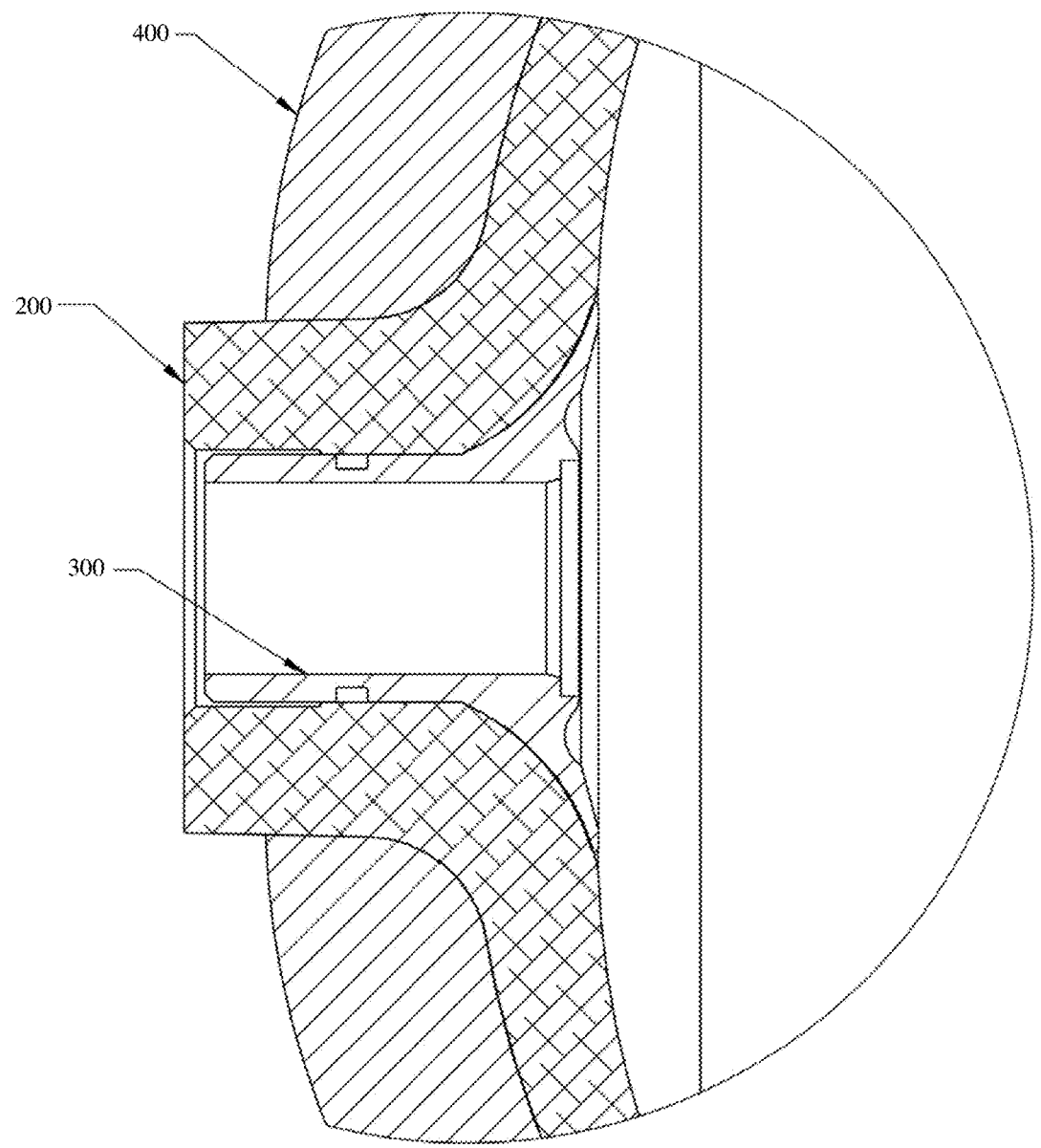
FIG. 5 is a partial cross-sectional view of another embodiment of a pressure vessel of the invention with a polar boss inserted inside the orifice.

As shown in FIG. 5, in another embodiment, polar boss 300 is inserted into liner 200. Thus, in this embodiment polar boss 300 is mechanically engaged to liner 200 by having the outside surface of the polar boss neck region attached to inner surface of the liner neck region. In particular, polar boss 300 is fitted onto the liner neck region by inserting the polar boss neck region into the liner neck region and mechanically engaging the two components. This embodiment is similar to the embodiments described above except that it is the outer surface of the polar boss that is engaged to the inner surface of the liner neck region. This embodiment of the invention is achieved by inserting the polar boss into the liner rather than inserting the liner into the polar boss as described above. Such a pressure vessel can be produced, for example, by inserting the polar boss into the liner through the orifice in the opposite end of the liner. In some instances within this embodiment, at least a portion of the annular flange of the polar boss is mated onto the inner surface of the liner polar region.

In some embodiments, the pressure vessel of the invention comprises two liner orifices and polar bosses. In such embodiments, typically one of the liner orifice is smaller than the other. Typically, in such embodiments, one of the polar boss is attached to the inner surface of the liner orifice and the other is attached to the outer surface of the other liner orifice. However, it should be appreciated that the scope of the invention is not limited to such a configuration as both polar bosses can be attached to the inner surface or the outer surfaces of the liner orifices.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A metal lined composite overwrapped pressure vessel comprising:
   (a) a liner constructed from a metallic material and comprising:
      (i) a liner orifice;
      (ii) a liner neck region surrounding said orifice and having an outer surface comprising a male threaded element; and
      (iii) a liner polar region surrounding said liner neck region;
   (b) a polar boss constructed of a second material, wherein said polar boss comprises:
      (i) a polar boss neck region having an inner surface comprising a complementary female threaded element, wherein at least a portion of the inner surface of said polar boss neck region is attached to at least a portion of the outer surface of said liner neck region by having at least a portion of said male threaded element engaged to at least a portion of said complementary female threaded mechanism, and wherein at least a portion of said female threaded element is adapted for direct connection to a port fitting device;
      (ii) a passage within said polar boss neck region that is coaxially aligned with said liner orifice; and
      (iii) a polar boss annular flange that extends radially outward from said polar boss and covers at least a portion of said liner polar region and is adapted to transfer the internal pressure load to a composite overwrap, wherein said second material has static strength, fatigue strength, endurance, chemical resistance and/or corrosion resistance greater than that of said metallic material; and
   (c) composite overwrap contacting at least a portion of said liner and said polar boss annular flange.

2. The pressure vessel of claim 1, wherein said metallic material comprises aluminum, aluminum alloy, copper, titanium, steel alloy, or a combination thereof.

3. The pressure vessel of claim 2, wherein said second material comprises steel, a ceramic, a metal alloy, steel, steel alloy, titanium, aluminum alloy, brass, beryllium, a ceramic, a composite material, or a combination thereof.

4. The pressure vessel of claim 1, wherein said polar boss is attached to said liner by a mechanical connection.

5. The pressure vessel of claim 1, wherein said polar boss is attached to said liner by an adhesive.

6. The pressure vessel of claim 1, wherein the diameter of said liner orifice is at least 2 inch (50 mm).

7. The pressure vessel of claim 1 further comprising a bladder that is inserted into said liner.

8. The pressure vessel of claim 7, wherein said pressure vessel is configured for use as a hydraulic accumulator.

9. The pressure vessel of claim 1 further comprising a port fitting device connected to said polar boss, wherein said port fitting device is a valve, a housing for poppet valve, a nozzle, a plug, a regulator, a pressure sensor, a temperature sensor, a pressure relief device or an telematics instrument to monitor the health of the pressure vessel.

10. A method for reinforcing a neck region of a composite overwrapped pressure vessel that comprises a liner constructed of a metallic material and comprising:
 a liner orifice;
 a liner neck region surrounding said liner orifice and comprising an outer surface that comprises a male threaded element; and
 a liner polar region surrounding said liner neck region, said method comprising:
 engaging the male threaded element of the outer surface of the liner neck region with a complementary female threaded element in an inner surface of a polar neck region of a polar boss that is constructed from a second material having a greater mechanical strength than that of said metallic material, thereby providing a stronger mechanical strength within the liner neck region of said composite overwrapped pressure vessel compared to the same pressure vessel in the absence of said polar boss, wherein said polar boss comprises a polar boss flange that extends radially outward from said polar boss; and
 contacting at least a portion of said liner and said polar boss annular flange with a composite overwrap.

11. The method of claim 10, wherein at least portion of said liner and said polar boss is overwrapped with a composite material.

12. The method of claim 10, wherein at least a portion of said liner neck region is securely fitted into an orifice of said polar boss neck region.

13. The method of claim 10, wherein at least a portion of said polar boss neck region is securely fitted into an orifice of said liner neck region.

14. A metallic-lined composite overwrapped pressure vessel comprising:
 (a) a liner constructed from a metallic material and comprises:
  a liner orifice;
  (ii) a liner neck region surrounding said orifice and having an outer surface comprising a male threaded element that is configured to securely attach a polar boss; and
  (iii) an inner liner polar region surrounding said liner neck region;
 (b) a polar boss constructed from a second material having a static strength, fatigue strength, endurance, chemical resistance and/or corrosion resistance greater than that of said metallic material, wherein said polar boss comprises:
  (i) a polar boss neck region having an inner surface comprising a complementary female threaded element that is configured for securely attaching to the male threaded element that is present on the outer surface of said liner neck region, wherein the engagement of said male threaded element to said complementary female threaded element prevents a relative movement between said liner and said polar boss;
  (ii) a passage within said polar boss neck region that is coaxially aligned with said liner orifice and said liner neck region; and
  (iii) a polar boss annular flange that extends radially outward from said polar boss and contacts at least a portion of an inner surface of said liner polar region, and
 (c) composite overwrap contacting at least a portion of said liner and said polar boss annular flange.

15. The metallic-lined composite overwrapped pressure vessel of claim 14, wherein said polar boss is removably attached to said liner.

16. The metallic-lined composite overwrapped pressure vessel of claim 14 further comprising:
 (i) a second liner orifice that is distal to said liner orifice;
 (ii) a second liner neck region surrounding said second liner orifice and having an outer surface with an engagement element configured to securely attach a second polar boss; and
 (iii) an outer liner polar region surrounding said second liner neck region; and
 (b) a second polar boss constructed from a material having a static strength, fatigue strength, endurance, chemical resistance and/or corrosion resistance greater than that of said metallic material, wherein said second polar boss comprises:
 (i) a second polar boss neck region having an inner surface with an engagement element configured for securely attaching to the engagement element of the outer surface of said second liner neck region, wherein the engagement element on the inner surface of said second polar boss neck region is securely attached to the engagement element of the outer surface of said second liner neck region;
 (ii) a passage within said second polar boss neck region that is coaxially aligned with said second liner orifice and said second liner neck region; and
 (iii) a second polar boss annular flange that covers at least a portion of an outer surface of said second liner polar region.

17. The metallic-lined composite overwrapped pressure vessel of claim 16, wherein said liner orifice and said second liner orifice are on the opposite ends of said pressure vessel.

* * * * *